March 19, 1929.  J. H. COOMBS  1,705,901
MATERIAL SPREADER
Filed Jan. 26, 1927
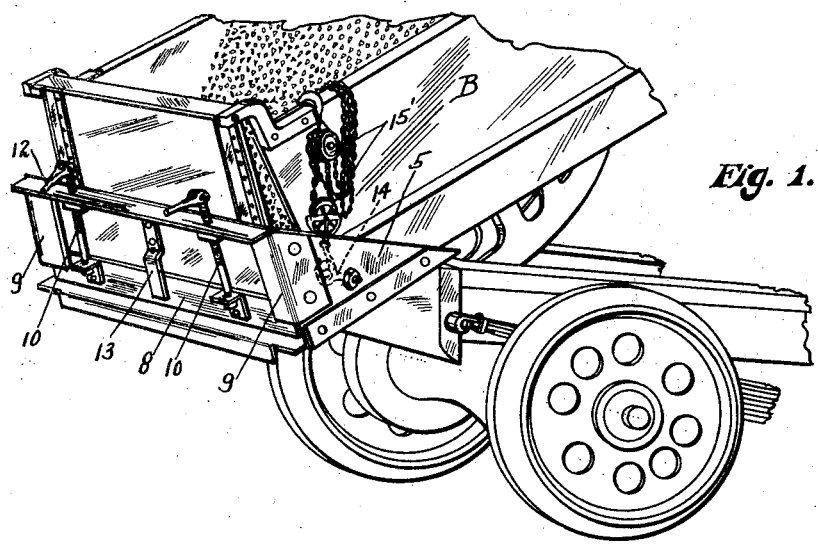
Fig. 1.
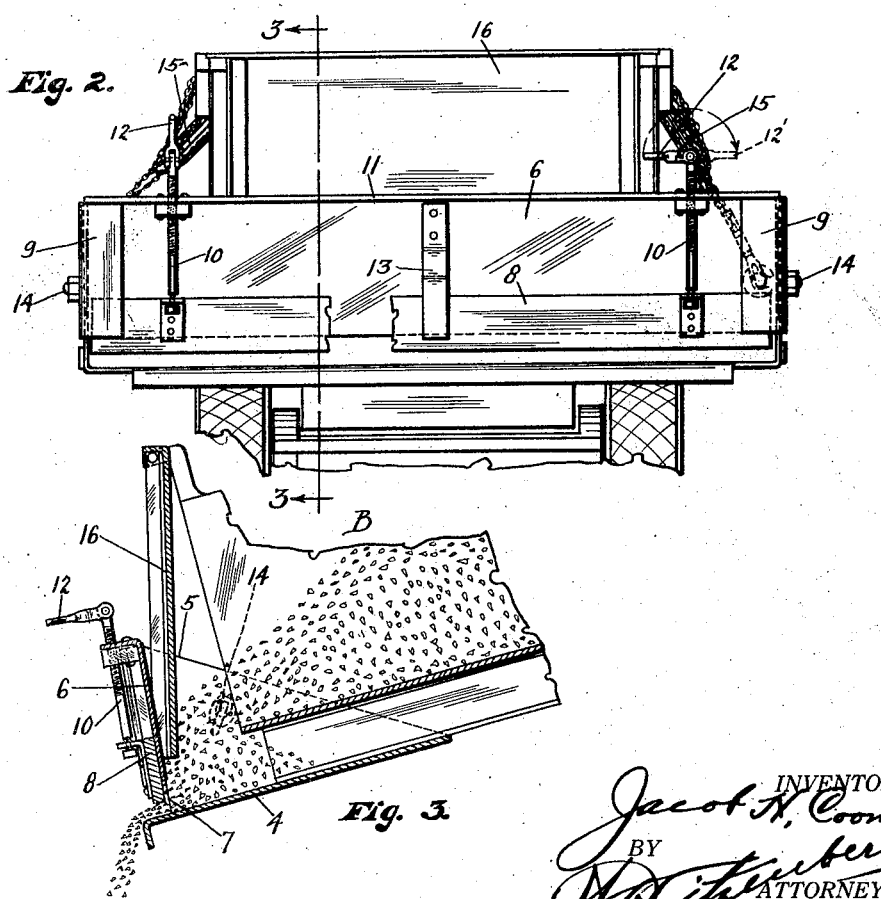
Fig. 2.
Fig. 3.
INVENTOR.
Jacob H. Coombs
BY
ATTORNEY.

Patented Mar. 19, 1929.

1,705,901

UNITED STATES PATENT OFFICE.

JOSEPH H. COOMBS, OF PASADENA, CALIFORNIA.

MATERIAL SPREADER.

Application filed January 26, 1927. Serial No. 163,717.

My invention relates to material spreaders, and more particularly to a device designed for spreading rock, gravel, sand and the like in a layer along a roadway or other surface to be covered, although it can be adapted for spreading any loose material in more or less even layer upon a surface.

In order to explain my invention, I have illustrated it as embodied in a device for spreading rock or gravel or sand in a uniform layer along a roadway, and particularly for spreading crushed rock over a surface which has been previously covered with tar, asphalt or other comparatively soft coating, and where it is desired to cover said coating with such rock or gravel before vehicles pass over it. I accomplish this by attaching my material spreader to the discharge end of a dump truck and run said truck backwards over the coated roadway or surface spreading the rock or gravel ahead of the wheels of said truck, thus covering the coating with the rock or gravel in advance of the wheels of the truck.

One of the main objects of my invention is to provide a simple, practical and economical material spreader which can be detachably secured to the discharge end of a dump truck and used therewith to discharge the load therefrom, and then be detached and left on the job for use with the next truck load.

Another object is to provide a device of the character referred to which is longer than the width of the carrier or truck body and equal at least to the over-all width of the wheels of said truck or carrier, so that a layer of material as wide as the trackage of the carrier will be covered.

Another object of the invention is to provide a material spreader of the character referred to in which the discharge opening therefrom can be regulated for the purpose of determining the thickness of the layer of the material discharged therefrom.

Other advantages and objects of the invention will appear from the following description of one practical embodiment thereof, taken in connection with the accompanying drawings, in which:

Figure 1 is a fragmentary, perspective view of the rear end of a dump track or carrier, with my invention attached thereto;

Figure 2 is a rear end view of the truck with my invention in place; and

Figure 3 is a vertical view taken on line 3—3, of Fig. 2, illustrating the use of the invention.

My invention as here illustrated for descriptive purposes consists of a hopper-like body having the bottom or floor, 4, the triangular ends, 5, 5, and the back wall, 6, with an opening, 7, along its lower edge and just above the bottom, 4, as will be clear from Fig. 3. A discharge gate, 8, is adjustably mounted against the outside of said back wall, 6, with its opposite ends moving in slideways provided by the angle corner plates, 9, 9, said discharge gate, 8, being provided with adjustment screws, 10, 10, extended through a rearwardly projecting flange, 11, at the top of the back wall, 6, as indicated, said adjustment screws, 10, 10, being provided with crank nuts, 12, 12, for raising and lowering said discharge gate, 8, to regulate the size of the discharge opening at 7, as will be clear from Fig. 3. A reinforcing strap, 13, is shown in the back wall and overlying said discharge gate, 8.

Said spreader is also provided on the inner sides of its end members, 5, 5, with eye-bolts, 14, 14, to which are attached one end of a chain block, designated as a whole, 15, there being one at each end, the other end, or hook, of said chain block being hooked over the sides of the body, B, of a dump truck, in the manner clearly illustrated, and by means of which chain block, said spreader is drawn up close under the rear or discharge end of said truck body B, substantially in the manner illustrated.

When the end-gate, 16, of said dump truck is released, it opens at its lower edge and swings into said spreader until it rests against the back wall, 6, thereof, as shown in Fig. 3, allowing the material to run down into said material spreader and to the opposite ends thereof, and then out through the opening, 7, as indicated.

If the material is to be discharged upon a coated surface over which it is desired not to run the wheels of the truck until covered, the truck is moved backwardly over the surface, spreading the layer of material ahead of it and covering the entire path over which the truck wheels will run, thus laying a uniform layer of crushed rock, gravel, or sand, as the case may be ahead of the backwardly advancing truck, as will be clear from the drawings.

Attention is called to the method of discharge, as illustrated in Fig. 3. The hopper-like spreader body is an interposed feeding or spreading device which receives the material direct from the body of the carrier and discharges it in a uniform layer through the opening at 7, at the same time the material cannot all run into said spreader, but runs in as gradually as it runs out through the discharge outlet from the spreader. It is thus automatically controlled and as the body of the carrier is tilted at its forward end, all of the material runs as it can into said spreader and then out through the discharge opening in a uniform layer over the surface over which the carrier is to pass.

While I have shown one simple and practical embodiment of the invention, I am aware that changes can be made therein without departing from the spirit thereof, and I do not, therefore limit the invention to the showing made for descriptive purposes, except as I may be limited by the hereto appended claims.

I claim:

1. In combination with a truck body having an endgate to be released to discharge material therefrom, of a separate material spreader having a floor and end members and means for detachably suspending it under the end of said truck body whereby material from the end of the floor of said truck body falls down onto the floor of said material spreader, between said end members, said material spreader having a back wall member extending between said end members and rearwardly of said endgate on said truck body and above and perpendicular to the floor of said material spreader, with means for opening a space above said floor and the lower edge of said back wall member, whereby said material falling from said truck body onto said spreader floor moves rearwardly through said space across the floor of said material spreader, substantially as shown and described.

2. A material spreader adapted to be interchangeably used with trucks having an end discharge, said spreader including in combination, a floor, end wall members, and a rear wall member substantially perpendicular to said floor, said rear wall member being spaced at its lower edge above the floor of said spreader, a gate movable on said rear wall member to cover said space, means for adjusting said gate to open said space, means for suspending said spreader by its opposite ends to the rear of a truck, whereby material discharged from said truck falls first into said spreader and then through said space.

3. A material spreader for interchangeable use with standard trucks having an endgate hinged at its upper edge and swinging rearwardly at its lower edge, said spreader having a floor member adapted to be positioned substantially parallel with and under the rear end of the floor of said truck and projecting rearwardly beyond said truck floor, a rear wall above and substantially at right angles to said spreader floor and rigidly and permanently secured to said spreader floor, end wall members in the angle between said spreader floor and its rear wall and adapted to be positioned outside of the opposite sides of the truck with which it is used, a discharge gate operable on said rear wall member above said spreader floor with means for raising and lowering it to open a rearwardly opening discharge outlet, and means at the opposite ends of said spreader for detachably suspending it under the rear end of trucks.

Signed at Pasadena, Los Angeles county, California, this 18th day of January, 1927.

JOSEPH H. COOMBS.